UNITED STATES PATENT OFFICE.

CARL A. PFANSTIEHL, OF WAUKEGAN, ILLINOIS, ASSIGNOR TO PFANSTIEHL COMPANY, INC., OF NORTH CHICAGO, ILLINOIS, A CORPORATION OF NEW YORK.

METHOD OF PRODUCING FINELY-DIVIDED TUNGSTEN TRIOXID.

1,277,475.   Specification of Letters Patent.   Patented Sept. 3, 1918.

No Drawing.   Application filed November 19, 1914.   Serial No. 872,894.

*To all whom it may concern:*

Be it known that I, CARL A. PFANSTIEHL, a citizen of the United States, residing in Waukegan, in the county of Lake and State of Illinois, have invented certain new and useful Improvements in Methods of Producing Finely-Divided Tungsten Trioxid, of which the following is a full, clear, concise, and exact description.

My invention relates to a method for the production of finely divided tungsten trioxid ($WO_3$), and the object thereof is to produce by chemical process tungsten trioxid particles much finer than can possibly be secured by a grinding or other mechanical operation.

Metallic tungsten is now becoming an extremely important article of commerce. The grade and fineness of a metallic tungsten powder depends to no small extent upon the fineness and quality of the trioxid which is reduced to produce the metal. I may say at this point that I have found that in producing malleable or ductile tungsten it is highly desirable that the metallic tungsten employed be in the form of finely divided powder. Hence the desirability of producing finely divided tungsten trioxid which, when reduced to the metal, produces an extremely fine powder.

In accomplishing the objects of my invention I mix crude tungsten trioxid ($WO_3$) in hot water and add concentrated ammonium hydroxid to the solution thus formed. I then filter the mixture to remove what insoluble impurities may be present. The filtered mixture is now evaporated, or boiled, but not to dryness, as a result of which monoclinic crystals of ammonium paratungstate $(NH_4)_{10}W_{12}O_{41}, 5H_2O$, settle to the bottom of the evaporating vessel. The crystals of ammonium paratungstate are now removed from the bottom of the evaporating vessel, the soluble impurities being left in the solution. The crystals of ammonium paratungstate are then washed, preferably in distilled water, to cleanse them of the liquid which will cling to the crystals when they are removed from the evaporating vessel. The crystals are then dried.

The ammonium paratungstate is now dissolved in a large volume of hot water, after which the solution is treated with hydrochloric acid or nitric acid, which is sprayed or atomized into or onto the solution in very fine streams or mist, or is injected into the solution in the form of vapor. When the acid is injected in the form of vapor I have found it desirable to boil the acid in a suitable vessel and to conduct the acid gas through a suitable tube terminating in a porous nozzle or distributer, as for example a pipe or tube or plug formed of alundum or other ceramic material not attacked by the acid or the solution in which it is immersed. The acid gas seeping through the pores of the ceramic plug or nozzle reaches the solution of ammonium paratungstate in the most finely divided form.

It is my idea that the acid be so applied that the individual molecules of the acid come separately into contact with and attack individual molecules of the ammonium paratungstate. The resulting reaction precipitates tungsten trioxid in the form of an extremely fine powder.

The tungsten trioxid is now removed by filtration or decantation, washed and dried, and then heated to 500 or 600 degrees centigrade in a silica muffle to drive off any acid or remaining volatile substances.

The particles of tungsten trioxid purified and recovered in the manner above described are extremely uniform in size and are extremely small, in both of which respects they excel any of this material produced by the methods of the prior art.

The material produced in this way has for these reasons, or for some other reason, as possibly the shape of the particles, a peculiar property which is extremely advantageous in the production of metallic tungsten in malleable or ductile form. I have found that the metallic tungsten powder to which the tungsten trioxid produced by the above method may be reduced can be compressed with advantage to a much higher degree than is possible with the metallic tungsten powder reduced from tungtsen trioxids of the prior art. I have worked upon the theory that in compressing powdered metallic tungsten a certain part of the kinetic energy of the press is stored in the compressed mass of tungsten powder in the form of static energy, due to the interwedging of the tungsten particles one with another, and due possibly to the more or less complete deformation of the individual particles.

The energy thus stored in the compressed mass of powdered metallic tungsten is utilized at a later stage of the process of producing ductile or malleable tungsten bodies by utilizing this stored energy in compressing and welding the particles together when the mass is heated to a sufficiently high temperature. It is my idea that the internal stresses or strains between the several particles when heated to the proper temperature, are utilized in completely interwedging the particles one with another, thereby producing a perfectly homogeneous mass of metallic tungsten having no appreciable interstices between the particles.

The tungsten powder into which the above-described tungsten trioxid is reduced may be sintered to produce a far more homogeneous and more nearly amorphous metallic tungsten than is possible with the tungsten trioxids of the prior art.

Having thus described my invention, what I claim as new and desire to secure by Letters Patent of the United States is:

1. The method which consists in treating an aqueous solution of ammonium paratungstate with nitric acid which is in a very finely divided state to precipitate tungsten trioxid in the form of a fine powder.

2. The method which consists in injecting into a solution of ammonium paratungstate an acid in a nebulized form adapted to react with ammonium paratungstate to produce tungsten trioxid.

In witness whereof, I hereunto subscribe my name this 7th day of November, A. D. 1914.

CARL A. PFANSTIEHL.

Witnesses:
 ALBIN C. AHLBERG,
 H. A. NEIBURGER.